INVENTOR.
HENRY R. BILLETER
BY
PARKER & CARTER
ATTORNEYS

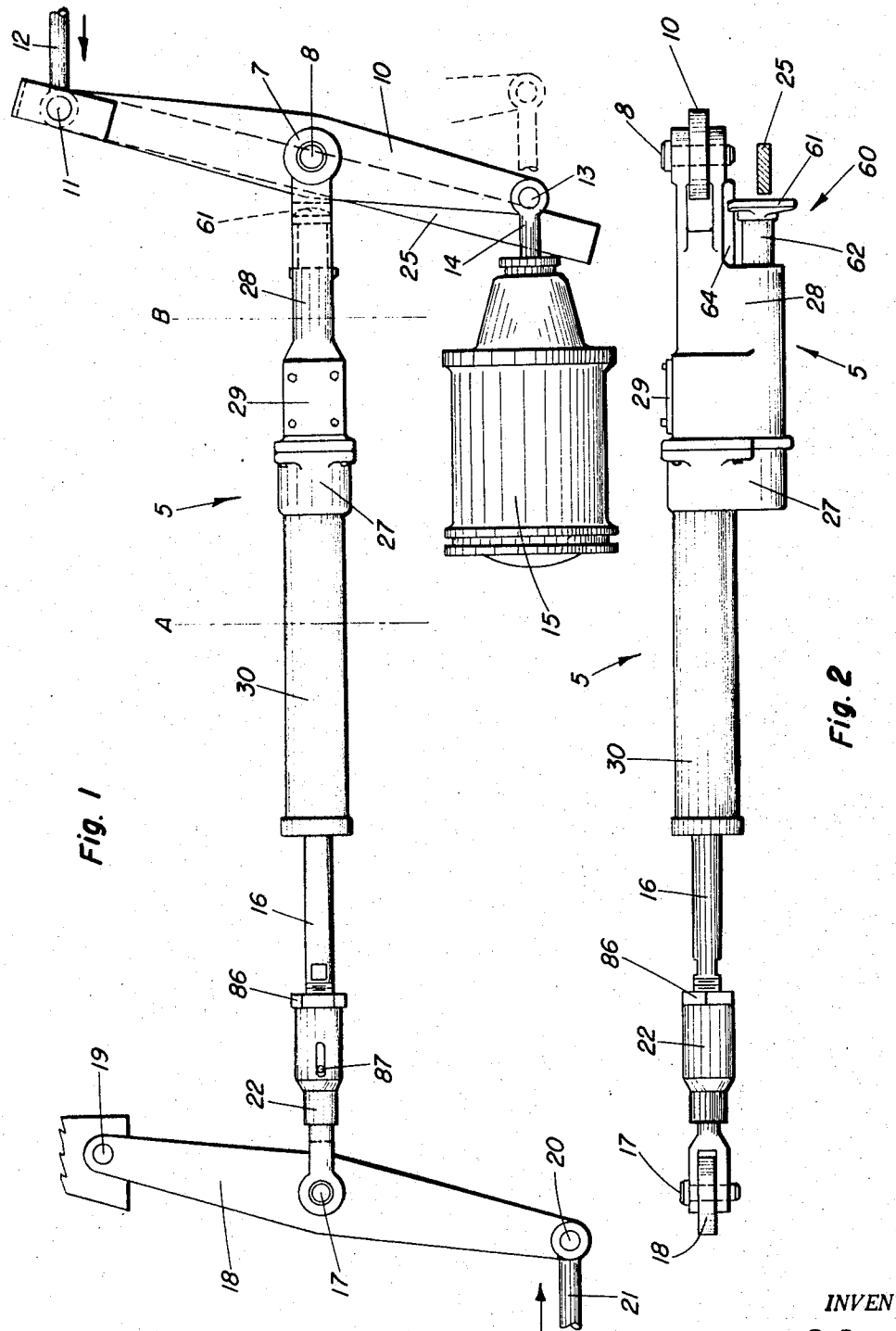

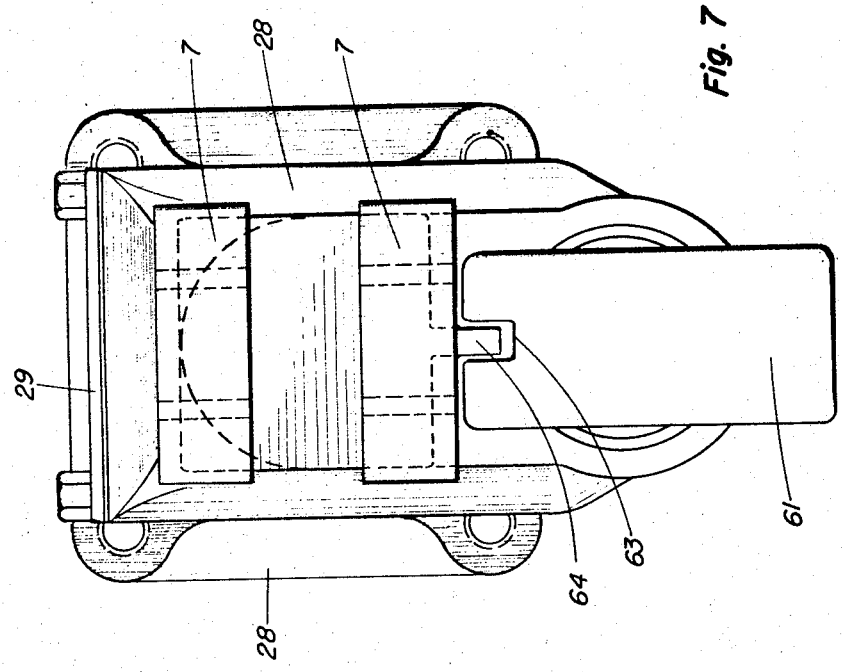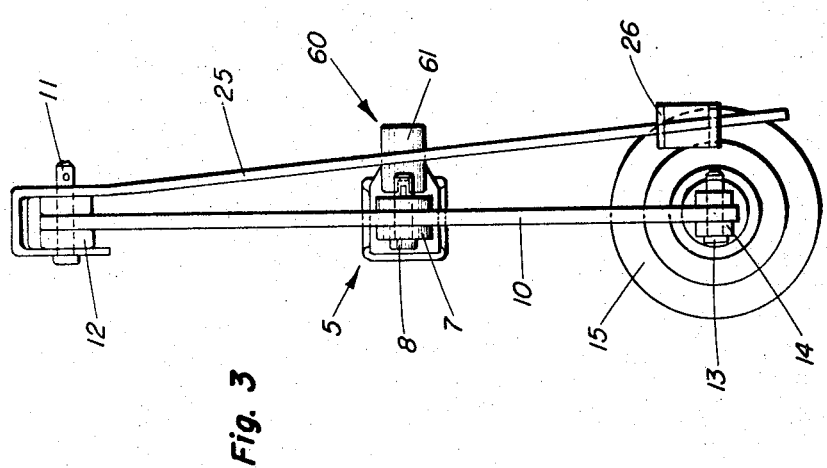

July 8, 1969   H. R. BILLETER   3,454,140
DOUBLE ACTING SLACK ADJUSTERS
Filed March 27, 1964   Sheet 5 of 5
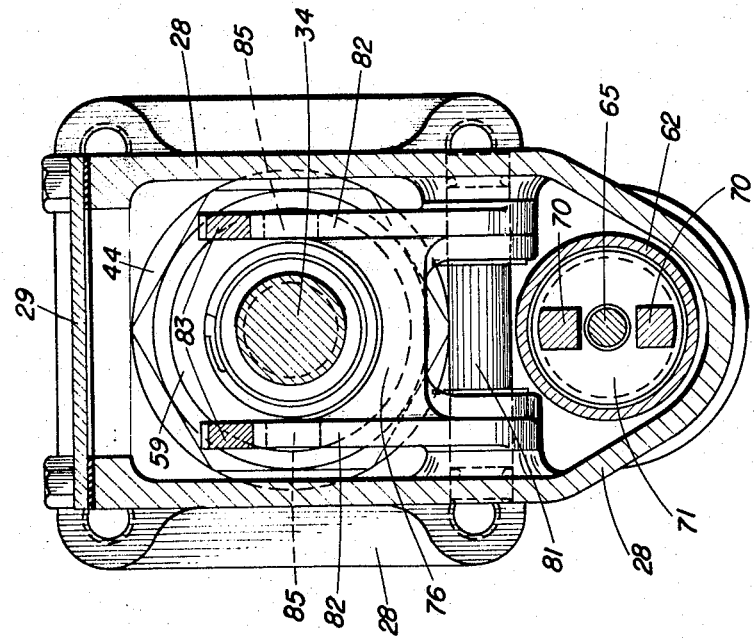
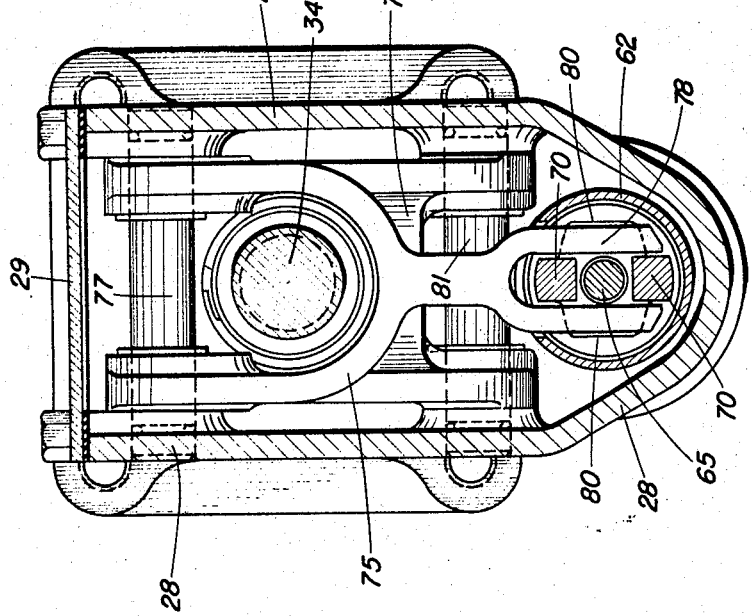
INVENTOR.
HENRY R. BILLETER
BY
PARKER & CARTER
ATTORNEYS United States Patent Office 3,454,140
Patented July 8, 1969

3,454,140
DOUBLE ACTING SLACK ADJUSTERS
Henry R. Billeter, Deerfield, Ill., assignor to Sloan Valve Company, Chicago, Ill., a corporation of Illinois
Filed Mar. 27, 1964, Ser. No. 355,356
Int. Cl. F16d 65/56, 65/38
U.S. Cl. 188—202
10 Claims This invention relates in general to slack adjusters for adjusting slack in the brake rigging of a railway car, and the principal object of the invention is to provide a new and improved double acting slack adjuster for automatically taking up and letting out slack in order to maintain optimum brake shoe clearance.

An object is to provide an improved slack adjusting device which will automatically maintain a predetermined brake cylinder rod travel by compensating for wear of the brake shoes and brake rigging, at each brake application.

Another object of the invention is to provide an improved automatic double acting slack adjuster for the brake rigging of railway cars in which the device always probes and then adjusts for excess slack or insufficient slack upon each operation of the braking equipment.

Another object of the invention is to provide an improved double acting slack adjuster which is relatively simple and rugged in construction, positive and reliable in action, automatically compensates for variations in slack in the brake rigging, and which is immune from false adjustments under service conditions.

Another object of the invention is to design a double acting slack adjuster for railway car brake rigging in which a single spin-nut axially turnable on a threaded rod is adapted to take up or let out slack in response to variables present in said brake rigging caused by brake shoe wear and other factors.

A further object of the invention is to design a double acting slack adjuster in which a complete adjustment of slack, either take up or let out, is accomplished upon each operation of the brake equipment.

Referring specifically to the drawings:

FIGURE 1 is a plan view illustrating a typical brake rigging arrangement on a railway car with the slack adjuster of the invention therein;

FIGURE 2 is a side view of FIGURE 1;

FIGURE 3 is a slightly enlarged end view of FIGURE 1;

FIGURE 7 is an enlarged right hand end view of the slack adjuster;

FIGURE 8 is a cross-sectional view taken along the line 8—8 of FIGURE 6; while

FIGURE 9 is a cross-sectional view taken along the line 9—9 of FIGURE 6.

Figure 4:
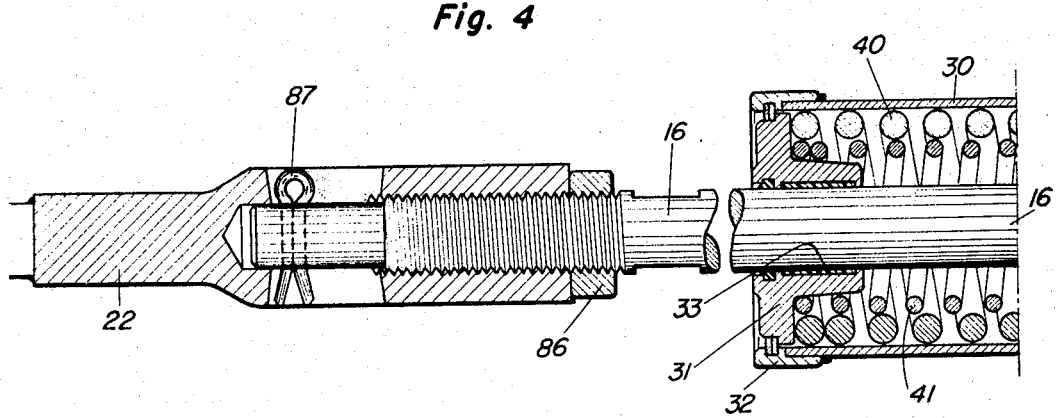
FIGURE 4 is a cross-sectional view of a portion of the left hand connecting end of the slack adjuster.
Figure 5:
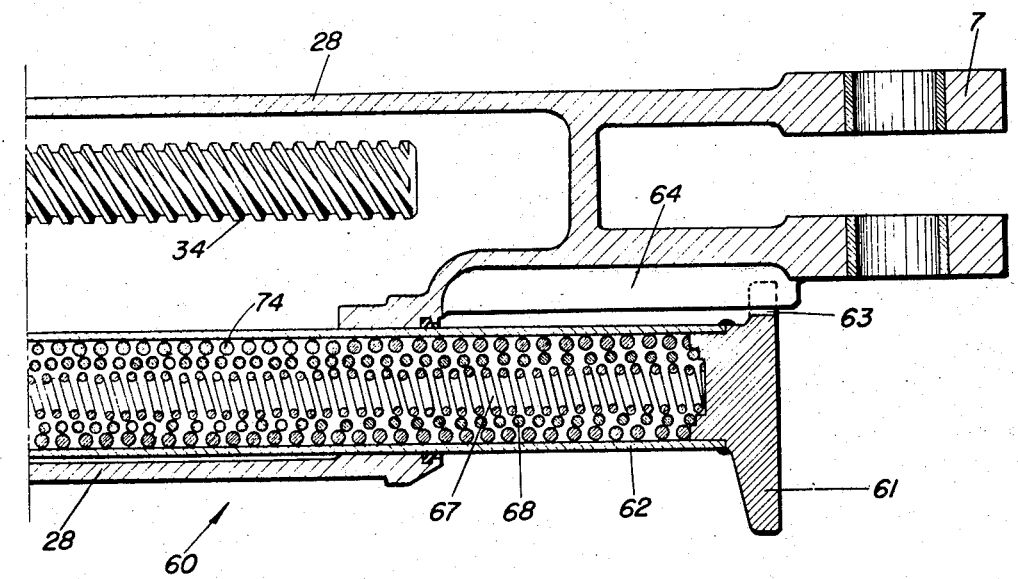
FIGURE 5 is a cross-section of a portion of the right hand end of the slack adjuster.
Figure 6:
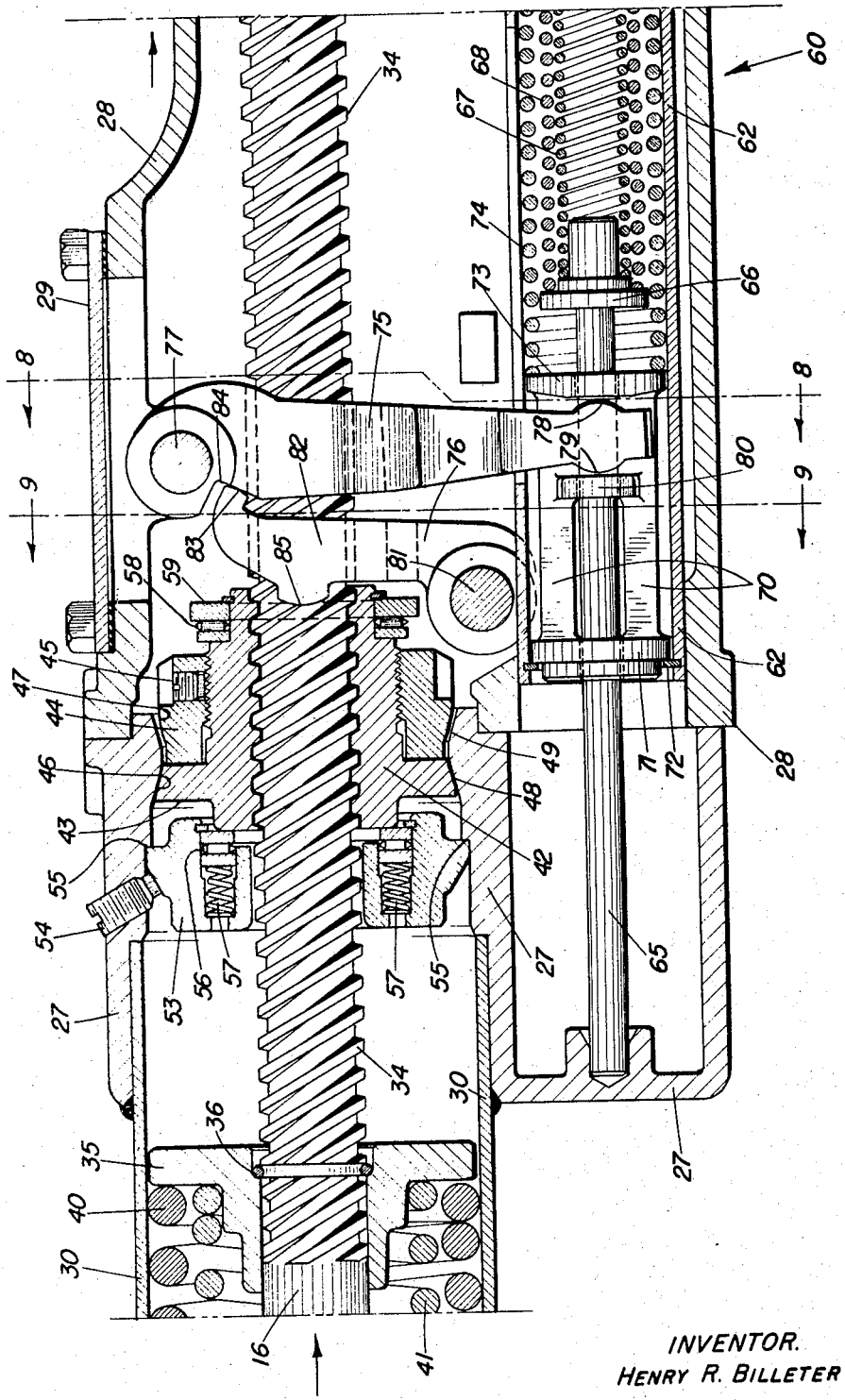
FIGURE 6 is an enlarged cross-sectional view of the center portion of the slack adjuster taken between the points A and B of FIGURE 1.

Referrnig to the drawings in detail, the improved double acting slack adjuster of the present invention is adapted to be installed in the brake rigging of a railway car between the brake cylinder push rod and brake shoes and as a connection in the brake rigging between two brake levers and when so installed will automatically take up or let out slack as needed to maintain the travel of the brake cylinder push rod within the limits prescribed by railroad practice regulations. The device indicated generally at 5 comprises a dust-proof sealed tubular outer casing connected at the right hand end by means of the clevis 7 and pivot pin 8 to the center portion of a live lever 10. The upper end of live lever 10 has a pivot pin 11 connecting to a portion of the brake linkage 12 and brake shoes (not shown). The bottom end of live lever 10 is pivoted by pin 13 to the push rod 14 of the standard brake cylinder 15 having a movable piston therein responsive to the usual brake control of the railway car.

The left hand end of the slack adjuster 5 has a power rod 16 with a pin 17 pivoted to the center portion of a dead lever 18. This lever 18 in turn is pivoted at 19 at one end to a part of the railway frame, and at its other end pivoted at 20 to a portion of the brake linkage 21 attached to the brake shoes. Additionally adjacent the live lever 10 (FIGURE 3) there is an actuating lever 25 also pivoted on pin 11 and having its lower end loosely slidable and pivoted in a slot formed in bracket 26 fixed to the car frame. The general arrangement of the foregoing is such that outward projection of the push rod 14 by action of the brake cylinder 15 results in the movement of the levers 10 and 18 about their pivots and the slack adjuster 5, so that braking pull is applied to linkages 12 and 21 in the direction of the arrows as shown, to produce a brake application.

The housing 5 is preferably made as two hollow tubular casings 27 and 28 bolted together at flanges formed at their abutting portions as shown. A cover plate 29 is bolted over an opening in the casing 28 to permit access to a portion of the internal mechanism. One end of tubular power rod housing 30 is welded to casing 27 and therefore movable therewith, while the other end has a bushing 31 held in place by ring 32 welded to the tube end and by a retaining ring. Bushing 31 is provided with an axial opening and sealing means 33 therein through which the power rod 16 slidably extends. Power rod 16 is axially disposed for relative shifting movement within tubular housing 30 and casings 27 and 28, and for a substantial portion of its length within the casings is provided with non-self locking threads 34 having a high helix angle. A bushing 35 held in place by a lock ring 36 on power rod 16 is slidable in tubular housing 30 together with the rod.

Main power spring 40 within tubular housing 30 is compressible between bushings 31 and 35 and normally tends to link the power rod 16 to the casing 27 and to restore the slack adjuster mechanism upon brake release. An auxiliary power spring 41 between the power rod 16 and power spring 40 serves to provide additional spring rate or force and a more uniform spring load. Power springs 40 and 41 together provide a maximum of about 450 pounds pressure when compressed within a range of movement of about 14 inches of the tubular casing 30.

A spin-nut 42 is provided having threads so as to be rotatable in either direction on the threaded rod 34. The nut is constructed of two separate portions 43 and 44 threaded together and locked by set screw 45. The outer peripheral edges of spin-nut 42 are formed with opposite tapered surfaces 46 and 47 which are adapted to be moved into frictional contact with the conical clutch surfaces 48 and 49 respectively, formed around the inner diameter of casing 27. Depending upon certain conditions present in the action of the slack adjuster, as will be pointed out, either the spin-nut surface 46 will be in engagement with friction clutch surface 48 or spin-nut surface 47 with friction clutch 49, to stop the spin-nut 42 from rotating. When the spin-nut friction surfaces 46 and 47 are disengaged from both friction clutches 48 and 49, it is free to rotate on the threads of rod 34 to either take up or let out slack as will be pointed out.

The spin-nut 42 has a bearing surface on the left hand side engaging a disc 53 held in place in the casing 27 by set screw 54 and against shoulder 55 formed in the casing. A needle thrust bearing 56 and its thrust washer are locked in disc 53 as shown and are urged into contact with the spin-nut 42 by a number of light springs 57 having a pressure of about 5 pounds when compressed and whenever the spin-nut is forced away from clutch surface 48. The right hand side of spin-nut 42 has a similar needle bearing 58 and associated bearing washers 59 attached thereto as shown.

The trigger mechanism indicated generally at 60 is provided for the purpose of sensing the need for adjustment in the condition of the brake rigging and for controlling such action. It includes a nose or trigger button 61 positioned closely adjacent the lever 25 for abutting relationship therewith. It is welded to the end of a barrel or tube 62 which tube is slidable within the casing 28. To prevent rotation of the tube 62 a notch 63 is formed in the trigger button 61 which notch is slidable along a rib 64 formed in the side of casing 28. A return spring rod 65 is secured at the left hand end in casing 27 and has a bushing 66 fastened at its other end within the barrel 62. Between the end of bushing 66 and the trigger button 61 there is a pair of trigger return springs 67 and 68 arranged axially one within the other. The two springs together provide the required spring rate to keep from building up the spring load rate too fast. Springs 67 and 68 combined are arranged to exert a restoring force for the trigger mechanism of about 60 pounds when compressed to the maximum distance that the trigger button 61 can move the barrel 62 inward. The trigger mechanism 60 also includes a spring plunger 70 axially slidable on spring rod 65 and also slidable within the trigger barrel 62. A collar 71 on the left end of plunger 70 abuts a snap ring 72 fixed in barrel 62 while on the other end there is a second collar 73. A main trigger return spring 74 has an end resting against collar 73 tending to hold the plunger 70 against the stop snap ring 72. The opposite end of main return spring 74 abuts the trigger button 61. This spring 74 surrounds both springs 67 and 68 and is arranged to provide a spring thrust of about 75 pounds when compressed the maximum amount of movement of trigger button 61.

The connecting linkage between the trigger mechanism 60 for controlling the action of the spin-nut 42, consists of a pair of compound levers 75 and 76 as more clearly seen in FIGURES 8 and 9. The release lever 75 is double U-shaped, the upper legs of which are pivoted by pin 77 in turn journaled in the sides of casing 28. The upper legs also straddle the threaded rod 34 while the lower legs straddle the plunger 70 and the spring rod 65. Oppositely disposed abutments 78 and 79 formed in the lower legs are adapted to be engaged in one instance by bushing 73 and in the release action by the projection 80 formed on plunger 70. The second lever 76 has a pair of lower legs pivoted by pin 81 in turn journaled in the sides of casing 28 as shown, and a pair of upper legs 82 which straddles the power rod 34. Upper legs 82 each have a bearing surface 83 engaging a recess 84 formed near the pivot end 77 of the lever 75. On the opposite side of legs 82 from bearing surfaces 83, there is a second pair of bearing surfaces 85 which is arranged on opposite sides of the power rod 34 and is normally in sliding engagement with the thrust washer 59 of bearing 58.

From the foregoing construction and arrangement of parts it will be seen that movement of the trigger tube 62 is transmitted to the lever 75 and this in turn to lever 76 which then engages the thrust bearing 58 of spin-nut 42 causing a certain control to be exercised upon the spin-nut. The ratio of lever operation between the two levers is preferably of the order of 10 to 1.

The slack adjuster is preferably provided with means for making an initial rough adjustment when installed in brake rigging of a railway car. This takes the form of a lock nut 86 on power rod 16 and in threaded engagement with the clevis connection 22 together with a cotter pin 87 to prevent turning of the power rod 16 as seen in FIGURE 4.

Since the interiors of the casings 28 and 29 as well as tubes 30 and 62 are sealed from entry of dirt, moisture, and other foreign substances, the interiors may be provided with suitable lubrication for the various movable parts of the device.

For reasons well understood in the art, the maximum stroke of the brake cylinder push rod 14 in a brake application must not exceed 12 inches, and an optimum range of about 8 inches is usually selected for the slack adjuster to make its automatic adjustment for abnormal slack which may be present in the brake shoes and rigging. In the present invention, the slack adjuster is arranged to probe or test for slack or lack of it each time the brakes are applied. To this end, the device first lets out a certain amount of slack (⅝") and then takes up the same amount upon brake release, provided there has been no change in the slack, and the amount is normal. The trigger button 61 normally is positioned closely adjacent the actuating lever 25 when the brakes are in their released or in running position as shown in FIGURE 1.

The slack adjuster and its various parts are shown in the drawings in the brake released position and installed in a typical brake linkage system on a railway car. When a brake application is made the push rod 14 is forced outward by air pressure in the brake cylinder 15, and since the upper end of the actuating lever 25 is pivoted at 11 together with live lever 10, and the lower end of lever 25 is slidably restrained by the bracket 26 (FIGURE 3) levers 10 and 25 will separate angularly about pin 11. The adjuster housing clevis 7 being pivoted at 8 to the center portion of live lever 10, the angular movement of both levers 10 and 25 will cause the edge portion of actuating lever 25 at its mid point to contact the trigger button 61 and actuate it. The movement of the lower end of live lever 10 by the push rod 14 is preferably calculated at about 8 inches before the mid point of the lever 25 engages the trigger button 61 after a movement of approximately ⅝ inch at that point.

However, prior to the foregoing movement of the lever 10 and the presence of a condition indicating insufficient slack, and the need for letting it out, the slack adjuster casing 5 and power rod 16 move to the right together as a solid link unit in the rigging. This occurs because the spin-nut surface 46 is in frictional contact with the left side clutch surface 48 due to the tension of main return springs 40 and 41 on the threaded power rod 16. The brake shoes next engage the car wheels to create tension in the brake rigging resulting in overcoming the tension in main springs 40 and 41 so that the spin-nut 43 leaves the clutch surface 48 and is free to spin on the threads 34 and against bearing 56. This causes a lengthening or letting out of the slack adjuster and occurs each time the brakes are applied at the beginning of the brake application.

When the brake cylinder has actuated the push rod 14 a distance of approximately 8 inches and after brake tension has been put in the rigging, to set the brakes, the mid point of the lever 25 will have engaged the trigger button 61 after a movement of ⅝ inch of the lever 25. When this occurs, the trigger button 61 pushes the trigger tube 62 to the left, compressing the trigger return springs 67 and 68 as well as the main spring 74. The trigger spring 74 pushes the plunger 70 and its collar 73 against the cam surface 78 of release lever 75 thereby pivoting it about its upper pin 77. The trigger tube 62 at its left hand end likewise tends to move the stop washer 72 away from the bushing 71 on the rear of plunger 70.

The movement of release lever 75 now causes its upper end cam surface 84 to push against the abutment 83 to rotate the second lever 76 about its lower pivot 81 and this in turn forces abutment 85 against the side of thrust washer 59 and its bearing 58 supported on the spin-nut 42. As a result of this pivoting action of release levers 75 and 76, the spin-nut 42 is thus locked on the threaded power rod 34 by its engagement with the friction surface 49 at the right hand side 47 of the spin-nut. The power rod 16 and casing 28 are now rigidly linked together as a unit in the brake rigging and the full power of the brake push rod 14 is therefore transmitted to the brakes by the brake cylinder 15. The main springs 40 and 41 are also further compressed at this time to make the slack adjuster linkage relatively rigid in the brake rigging.

Assume now that instead of insufficient slack in the rigging, a certain amount of wear in the brake shoes and linkage takes place which occurs gradually under service conditions. Then a reduction of the amount of slack in the system must be made to a point consistent with brake regulations and to insure that the travel of the brake cylinder piston will not exceed the standard 8 inches permitted. When the above situation prevails (too much slack) the application of braking power to the brake levers 10 and 18 results in a small amount of slack being initially let out as before. However, because of the excess slack, the actuating lever 25 will engage the trigger button 61 after the ⅝ inch travel, before there is any tension in the rigging and prior to the engagement of the shoes with the wheels. The levers 75 and 76 will be actuated by the trigger plunger 70 to engage the spin-nut 42 and shift it away from its frictional engagement with clutch surface 48 and against the force of main springs 40 and 41. The power springs 40 and 41 are therefore effective to force the threaded power rod to the right causing rotation of the spin-nut 42 to the left on the rod between bearing 58 and 56. The spring sets 57 are only strong enough to prevent the engagement of the spin-nut with the clutch surface 49 and allow the spin-nut to rotate freely during this driving action. The slack adjuster is accordingly shortened.

When the spin-nut 42 has taken up all the slack in the system and tension is present in the rigging due to engagement of the brake shoes with the wheels, the force of return springs 40 and 41 is overcome and they become more compressed, locking the adjuster as a solid link in the system when the clutch surface 49 engages the spin-nut. Brake release action restores the equipment. Power springs 40 and 41 place the slack adjuster casing and power rod back to the normal running position shown while the springs 67, 68, and 74 restore the trigger mechanism 60, as well as the levers 75 and 76.

From the foregoing it is seen that the slack adjuster always lets out at least ⅝ inch of slack upon each brake application and then takes it up again upon brake release. Should there be excess slack caused by shoe wear this is automatically adjusted for by the mechanism causing the spin-nut to travel on the threaded power rod the required amount. This action would also take place in the event of loss of any brake shoes during travel of the railway car. In the event that there is insufficient slack in the system such as could be caused by the installation of new brake shoes, the adjuster will automatically let out slack to compensate for the same.

The invention is not to be limited to the exact embodiment illustrated and described, and it is obvious to those skilled in the art that the particulars of construction and operation may be still further varied within wide limits while maintaining the same purpose and manner of operations.

What is claimed is:

1. In an automatic double acting slack adjuster for adjusting for variations in the slack of brake rigging on railway cars, the combination of a threaded rod and a tubular casing connected together in said brake rigging as a link therein, a spin nut on said threaded rod, said spin nut and tubular casing having cooperative oppositely disposed clutch surfaces thereon, the mutual engagement of which stops the rotation of said spin nut, means responsive the presence of a normal amount of slack in said brake rigging for stopping said spin nut, means responsive to the presence of an abnormal amount of slack for rotating said spin nut on said threaded rod until a normal amount is produced in said brake rigging, said last means comprising an actuating lever in said brake rigging and a trigger mechanism on said slack adjuster controlled by said actuating lever, said trigger mechanism including a tube slidable in said slack adjuster casing, spring means and a plunger in said tube, said plunger actuated upon compression of said spring means by said tube, compound lever means pivoted in said slack adjuster casing having an operating end contacting said plunger for actuation thereby, the other end of said compound lever means being in operative relation to said spin nut, and bearings on each side of said spin nut.

2. In an automatic double acting slack adjuster for adjusting for variations in the slack of brake rigging on railway cars, the combination of a threaded rod and a tubular casing connected together in said brake rigging as a link thereon, a spin nut on said threaded rod, said spin nut and tubular casing having cooperative clutch means thereon for stopping the rotation of said spin nut, means for causing said spin nut to rotate to take up or let out slack, trigger mechanism for causing said clutch means to be effective to stop said spin nut when the slack is normal, said trigger mechanism being operated upon a predetermined movement of said brake rigging and comprising a trigger tube slidable in said tubular casing and a spring for restoring the same, a plunger in said trigger tube actuated upon compression of said spring by said trigger tube, a pair of cooperating pivoted levers in said tubular casing, one of said levers being in operative relation to said plunger for actuation thereby, and the other of said levers being in operative relation to said spin nut for stopping it from rotating by engaging the spin nut with said clutch surfaces, and bearing means on each side of said spin nut.

3. In an automatic double acting slack adjuster for adjusting for variations in the slack of brake rigging on railway cars, the combination of a threaded rod and a tubular casing connected together in said brake rigging and a link therein, a spin nut on said threaded rod, said spin nut and said tubular casing having cooperative clutch means thereon for stopping said spin nut from rotating, means for causing said spin nut to rotate to adjust said brake rigging for abnormal slack conditions therein, and trigger mechanism for causing said clutch means to be effective to stop said spin nut when the slack is normal, said trigger mechanism comprising a trigger tube slidable in said tubular casing and a restoring spring for the same, a plunger in said trigger tube actuated by the compression of said restoring spring when the trigger tube is operated, a pair of pivoted cooperating levers in said tubular casing, one of said levers being in operative engagement with said plunger and the other lever being in operative engagement with said spin nut, there being an abutting connection between said levers whereby one lever actuates the other with increased leverage, bearings on each side of said spin nut, and power spring means in said tubular casing for also causing said clutch means to stop the spin nut from rotating.

4. In an automatic double acting slack adjuster for adjusting for variations in the slack of the brake rigging on railway cars, the combination of a threaded rod and a tubular casing connected together in said brake rigging as a link therein, a spin nut on said threaded rod, cooperative clutch means on said spin nut and said casing for stopping said spin nut from rotating on said threaded rod when the slack in said brake rigging is normal, means for causing said spin nut to rotate when there is abnormal slack conditions in said brake rigging, and trigger mechanism on said slack adjuster comprising a trigger tube slidable in said tubular casing and having a first and a second restoring spring therein, a plunger in said trigger tube actuated by the compression of said first restoring spring, a trigger rod against which said second spring is compressed and upon which said plunger is axially slidable, a first lever pivoted at one end in said tubular casing and having its other end in operative engagement with said plunger, a second lever pivoted at one end in said tubular casing and having its other end in operative engagement with said spin nut, said second lever abutting said first lever adjacent its pivoted end to provide increased leverage therewith and against said spin nut, a bearing on said spin nut and a second bearing for said spin nut supported in said tubular casing.

5. In an automatic double acting slack adjuster as defined in claim 4 in which each of said levers straddles said threaded rod and each is pivoted on opposite sides of said threaded rod.

6. In an automatic double acting slack adjuster as defined in claim 4 in which each of said levers is arranged to straddle said threaded rod and each is pivoted on opposite sides of said threaded rod in said tubular casing, one of said levers also straddling said plunger at one end and being in abutting relationship with the free end of the other lever.

7. In an automatic double acting slack adjuster as defined in claim 4 in which the trigger tube is guided in said tubular casing and one of the restoring springs engages the plunger while the other engages the guide rod in the trigger tube, said plunger being slidable on said guide rod and movable independently by its spring from said trigger tube.

8. In an automatic double acting slack adjuster as defined in claim 4 in which said spin nut is rotated freely on said threaded rod for a predetermined short distance upon each brake application and brake release, regardless of whether there exists too much or too little slack in the brake rigging.

9. In an automatic double acting slack adjuster as defined in claim 4, in which said spin nut is rotated freely on said threaded rod for a predetermined short distance upon each brake application and brake release and regardless of whether there is too much or too little slack in the brake rigging, said trigger mechanism being actuated and effective to correct for abnormal amount of slack in the event said predetermined amount is exceeded.

10. A slack adjuster comprising a casing, a rod extending into said casing, a spin nut rotatable on said rod in said casing, clutch surfaces on said casing and said spin nut, yielding means urging said spin nut in one direction to engage some of said clutch surfaces and means for urging said spin nut in the opposite direction to engage others of said clutch surfaces, said last-named means comprising a yoke pivoted to said casing and engaging said spin nut on opposite sides of said rod, a second yoke pivoted to said casing and engaging said first yoke on opposite sides of said rod, a plunger slidable in said casing, said second yoke slidably engaging said plunger, and a trigger member slidable in said casing and having an operating engagement with said plunger.

References Cited

UNITED STATES PATENTS

| | | | |
|---|---|---|---|
| 2,084,989 | 6/1937 | Browall | 188—196 |
| 2,497,343 | 2/1950 | Carlbom | 188—196 |
| 2,767,811 | 10/1956 | Browall et al. | 188—196 |
| 3,091,311 | 5/1963 | Sander | 188—196 |
| 3,177,985 | 4/1965 | Rauglas | 188—202 |

DUANE A. REGER, *Primary Examiner.*

U.S. Cl. X.R.

188—196